US010086590B2

(12) United States Patent
Karagiannis et al.

(10) Patent No.: US 10,086,590 B2
(45) Date of Patent: *Oct. 2, 2018

(54) HIGH TG MONOLITHIC POLY(VINYL ACETAL) SHEET

(71) Applicant: Solutia Inc., St. Louis, MO (US)

(72) Inventors: Aristotelis Karagiannis, Amherst, MA (US); Megan L. Szlosek, Granby, MA (US); Yalda Farhoudi, Longmeadow, MA (US)

(73) Assignee: SOLUTIA INC., St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/563,025

(22) Filed: Dec. 8, 2014

(65) Prior Publication Data

US 2016/0159043 A1    Jun. 9, 2016

(51) Int. Cl.
| | |
|---|---|
| B32B 17/10 | (2006.01) |
| B32B 27/30 | (2006.01) |
| C08K 5/00 | (2006.01) |
| B29C 47/08 | (2006.01) |
| C08L 29/14 | (2006.01) |
| B29C 47/00 | (2006.01) |
| B29L 11/00 | (2006.01) |
| B29L 31/00 | (2006.01) |
| B29K 29/00 | (2006.01) |
| B29C 47/06 | (2006.01) |
| B29C 47/36 | (2006.01) |
| B29K 31/00 | (2006.01) |
| B32B 27/08 | (2006.01) |
| B32B 27/22 | (2006.01) |
| B32B 27/36 | (2006.01) |

(52) U.S. Cl.
CPC .... B32B 17/10761 (2013.01); B29C 47/0847 (2013.01); B32B 17/10018 (2013.01); B32B 27/30 (2013.01); C08K 5/0016 (2013.01); C08L 29/14 (2013.01); B29C 47/0004 (2013.01); B29C 47/0019 (2013.01); B29C 47/065 (2013.01); B29C 47/367 (2013.01); B29K 2029/14 (2013.01); B29K 2031/04 (2013.01); B29L 2011/00 (2013.01); B29L 2031/768 (2013.01); B32B 27/08 (2013.01); B32B 27/22 (2013.01); B32B 27/36 (2013.01); B32B 2270/00 (2013.01); B32B 2307/412 (2013.01); B32B 2307/418 (2013.01); B32B 2307/54 (2013.01); B32B 2307/558 (2013.01); B32B 2307/732 (2013.01); B32B 2367/00 (2013.01); B32B 2419/00 (2013.01); B32B 2551/00 (2013.01); B32B 2605/006 (2013.01); B32B 2607/02 (2013.01)

(58) Field of Classification Search
CPC ... B32B 17/10761; B32B 27/30; B32B 27/06; C08L 29/14
See application file for complete search history.

(56) References Cited

U.S. PATENT DOCUMENTS

| | | | |
|---|---|---|---|
| 2,282,026 A | 5/1942 | Bren et al. | |
| 2,282,057 A | 5/1942 | Hopkins et al. | |
| 5,137,954 A * | 8/1992 | DasGupta | B32B 17/10605 428/98 |
| 5,322,875 A * | 6/1994 | Dages | B32B 17/10761 524/151 |
| 5,728,472 A | 3/1998 | D'Errico | |
| 6,180,246 B1 | 1/2001 | Purvis et al. | |
| 6,825,255 B2 | 11/2004 | Yuan et al. | |
| 2010/0028642 A1 | 2/2010 | Steuer et al. | |
| 2011/0061714 A1* | 3/2011 | Keller | B32B 17/10761 136/244 |
| 2011/0076459 A1 | 3/2011 | Lu et al. | |
| 2012/0202070 A1 | 8/2012 | Asanuma et al. | |
| 2012/0244329 A1 | 9/2012 | Iwamoto et al. | |
| 2012/0263958 A1 | 10/2012 | Iwamoto et al. | |
| 2013/0074931 A1* | 3/2013 | Chen | C08K 5/1515 136/259 |
| 2013/0236693 A1 | 9/2013 | Lu | |

(Continued)

FOREIGN PATENT DOCUMENTS

| | | |
|---|---|---|
| EP | 2454314 B1 | 4/2013 |
| JP | 2001-206742 A | 7/2001 |
| WO | WO 2014-090895 A1 | 4/2013 |

OTHER PUBLICATIONS

Bremner et al. "Melt Flow Index Values and Molecular Weight Distributions of Commercial Thermoplastics". Journal of Applied Polymer Science, vol. 41, (1990); pp. 1617-1627.*
Notification of Transmittal of the International Search Report and the Written Opinion of the International Searching Authority, or the Declaration dated Mar. 28, 2016 for International Application No. PCT/US2015/063890.
Notification of Transmittal of the International Search Report and the Written Opinion of the International Searching Authority, or the Declaration dated Apr. 8, 2016 for International Application No. PCT/US2015/063896.
Wade; "Vinyl Acetal Polymers"; Encyclopedia of Polymer Science & Technology; 3rd edition; vol. 8; pp. 381-399 (2003).

(Continued)

Primary Examiner — Prashant J Khatri
(74) Attorney, Agent, or Firm — Steven A. Owen

(57) ABSTRACT

A polyvinyl acetal poly(vinyl acetal), such as polyvinyl butyral, resin formulation, a method of extruding poly(vinyl acetal) resins, and related materials and products that provide for monolithic poly(vinyl acetal) sheets and glass panes having high Tg of at least 50° C. and high modulus at acceptable rates as indicated by their high melt flow index. This is made possible by a reduction in the amount of plasticizer while using a low molecular weight resin not to exceed 160,000 to obtain a thermoplastic resin having a high melt flow index and high Tg. The articles made with these monolithic interlayer sheets can be used in applications that require good modulus at outdoor temperatures.

33 Claims, 3 Drawing Sheets

(56) References Cited

U.S. PATENT DOCUMENTS

2013/0236711 A1   9/2013   Lu
2014/0210128 A1   7/2014   Lin et al.

OTHER PUBLICATIONS

ASTM 1396-92 (Reapproved 1998); Standard Methods for Chemical Analysis of Poly(Vinyl Butyral).
ASTM D1238-13; Standard Test Method for Melt Flow Rates of Thermoplastics by Extrusion Plastomer.
ASTM D5026-06 (Reapproved 2014); Standard Test Method for Plastics: Dynamic Mechanical Properties: In Tension.
Co-pending U.S. Appl. No. 14/954,606, filed Nov. 30, 2015; Karagiannis et al.; now U.S. Patent Publication No. 2016-0159040.
USPTO Notice of Allowance for Co-pending U.S. Appl. No. 14/954,606 dated Jan. 22, 2014.
Office Action notification dated Dec. 22, 2017 received in co-pending U.S. Appl. No. 14/954,626.
Machine Translation of JP 2001-206742.

* cited by examiner

HIGH TG MONOLITHIC POLY(VINYL ACETAL) SHEET

1. FIELD OF THE INVENTION

The present invention relates to poly(vinyl acetal) sheets, and more particularly to monolithic poly(vinyl acetal) sheets having high glass transition temperature that can be extruded at reasonable process conditions. The poly(vinyl acetal) sheets having higher Tg can be used as an interlayer for laminated glass in more demanding structural applications that experience higher ambient temperature conditions.

2. BACKGROUND OF THE INVENTION

Generally, laminated multiple layer glass panels refer to a laminate comprised of a polymer sheet or interlayer sandwiched between two panes of glass. The laminated multiple layer glass panels are commonly utilized in architectural window applications, in the windows of motor vehicles, airplanes, trains and other modes of transporting people and goods, and in photovoltaic solar panels. The first two applications are commonly referred to as laminated safety glass. The main function of the interlayer in the laminated safety glass is to absorb energy resulting from impact or force applied to the glass, keep the layers of glass bonded even when the force is applied and the glass is broken, and prevent the glass from breaking up into sharp pieces. Additionally, the interlayer generally gives the glass a much higher sound insulation rating, reduces UV and/or IR light transmission, and enhances the aesthetic appeal of the associated window. In regards to the photovoltaic applications, the main function of the interlayer is to encapsulate the photovoltaic solar panels which are used to generate and supply electricity in commercial and residential applications.

The interlayer is generally produced by mixing a polymer resin such as poly(vinyl acetal) with one or more plasticizers and melt blending or melt processing the mix into a sheet by any applicable process or method known to one of skill in the art, including, but not limited to, extrusion. Other additional additives may optionally be added for various other purposes. After the interlayer sheet is formed, it is typically collected and rolled for transportation and storage and for later use in the multiple layer glass panels, as described below. Interlayer sheets of the appropriate size and thickness are sometimes cut, stacked and shipped in such stacks for later use in the multiple layer glass panels.

The following offers a simplified description of the manner in which multiple layer glass panels are generally produced in combination with the interlayers. First, at least one interlayer sheet, either monolithic or comprising of several coextruded or prelaminated layers ("multilayer interlayers"), is placed between two substrates, such as glass panels, and any excess interlayer is trimmed from the edges, creating an assembly. It is not uncommon for multiple monolithic interlayer sheets to be placed within the two substrates creating a multiple layer glass panel with multiple monolithic interlayers. It is also not uncommon for multilayer interlayer sheets that comprise several coextruded or prelaminated layers or in combination with monolithic interlayer sheets to be placed within the two substrates creating a multiple layer glass panel with multilayer interlayers. Then, air is removed from the assembly by an applicable process or method known to one of skill in the art; e.g., through nip rollers, vacuum bag, vacuum ring, vacuum laminator, or another de-airing mechanism. Additionally, the interlayer is partially press-bonded to the substrates by any method known to one of ordinary skill in the art. In a last step, in order to form a final unitary structure, this preliminary bonding is rendered more permanent by a high temperature and pressure lamination process known to one of ordinary skill in the art such as, but not limited to, autoclaving.

A structural poly(vinyl acetal) interlayer, Saflex™ DG41 (a poly(vinyl butyral) polymer having an Mw of about 170,000), is commercially available for applications in the architectural space. While the glass transition temperature Tg of DG41 is suitable for many architectural applications (~46° C.), it would be desirable to raise the Tg of the interlayer to take advantage of a full range of applications it could have in the architectural space. Higher Tg products are desirable as they may be able to cover more demanding architectural applications that are exposed to consistently higher temperatures, especially those that require high modulus at higher ambient temperatures.

One methodology to increase the Tg of the poly(vinyl acetal) interlayer is to reduce the amount of plasticizer in the poly(vinyl acetal) resin. Reducing the amount of plasticizer, however, decreases the flowability of the polymer composition making processing quite difficult. DG41 is already difficult to process in extrusion owing to its low level of plasticizer level, at about 20 parts of plasticizer per 100 parts resin. The low plasticizer level in DG41 decreases its flowability, resulting in reduction in melt flowability and manifests itself as a large pressure drop between the head of the extruder or the melt pump to the back face of the die plate with a corresponding drop in extruder output or capacity. Although the processing of DG41 is difficult, it remains at an acceptable level. However, attempting to increase the Tg of the poly(vinyl acetal) interlayer by further dropping the amount of plasticizer will so decrease the flowability of the polymer composition so as to make its processing unacceptable.

Increasing the plasticizer level assists in improving the polymer flowability, thereby facilitating processing in the extruder manifesting itself as a lower pressure between the extruder head or melt pump to the back face of the die. However, increasing the plasticizer level also decreases the Tg of the interlayer.

It would be desirable to provide a poly(vinyl acetal) thermoplastic resin that has both an enhanced Tg and has suitable flowability. The increase in Tg cannot be accomplished by a mere drop in the amount of plasticizer since, as already mentioned, the processing conditions suffer through large pressure drops resulting in a loss in output capacity.

3. SUMMARY OF THE INVENTION

We have discovered a poly(vinyl acetal) interlayer composition that has both an increased Tg and an acceptable flowability, thereby allowing it to be processed through an extruder at reasonable rates.

There is now provided a composition comprising:
(A) poly(vinyl acetal) resin in an amount of at least 60 wt. % based on the weight of the composition; and
(B) a plasticizer in an amount of at least 5 parts per one hundred parts of said poly(vinyl acetal) resin;
wherein said interlayer composition has a Tg of at least 46.0° and a melt flow index ("MFI") of at least 0.65 grams/10 minutes when measured at 190° C. at a load of 2.16 kilograms.

There is also provided a composition comprising:
(A) poly(vinyl acetal) ("poly(vinyl acetal)") resin having a weight average molecular weight (Mw) of 160,000 or less, and
(B) a plasticizer in an amount of at least 5 parts per one hundred parts of said poly(vinyl acetal) resin;
wherein said interlayer composition has a Tg of at least 46.0° C.

In each case, the composition is desirably a monolithic interlayer sheet.

There is further provided a process for making a monolithic interlayer sheet comprising poly(vinyl acetal), the method comprising:
(i) providing an extrusion system comprising die and an extruder having a barrel;
(ii) feeding a poly(vinyl acetal) resin and a plasticizer into the barrel and passing a molten thermoplastic composition comprising said poly(vinyl acetal) resin and plasticizer through the extruder and the die to produce an extruded sheet, wherein the melt flow index ("MFI") of the molten thermoplastic resin is at least 0.65 g/10 min when measured at 190° C. at a loading of 2.16 kg, and
(iii) cooling said sheet to produce a monolithic interlayer sheet having a Tg of at least 46.0° C.

4. BRIEF DESCRIPTION OF THE DRAWINGS

5. DETAILED DESCRIPTION OF THE INVENTION

Figure 1:
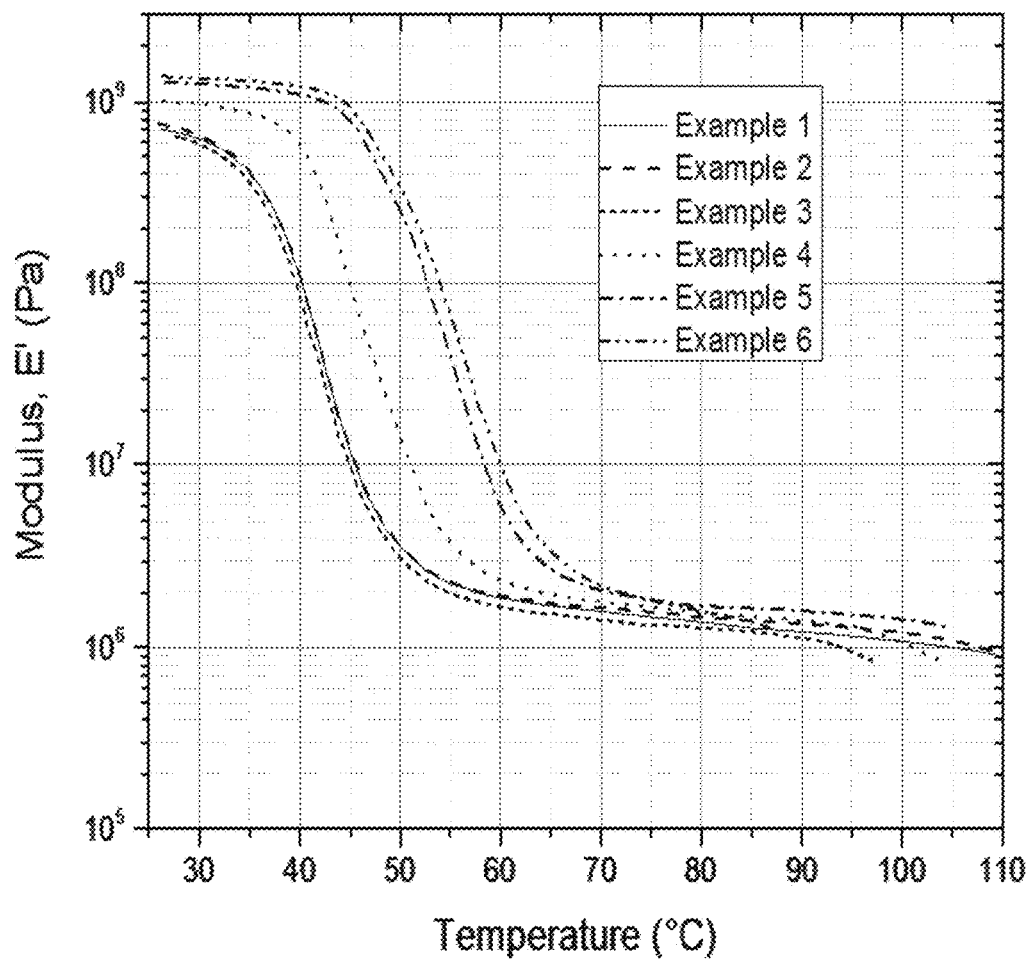
FIG. 1 is a graph showing the rigidity as determined by modulus for a variety of poly(vinyl acetal) resins having different Tg values.

The term "sheet" or "monolithic sheet" or "monolithic interlayer" is a single unitary layer or sheet formed from the thermoplastic composition of the invention. The monolithic interlayer or a sheet can contain a combination of two or more different types of polymers if desired.

There is now provided a composition comprising:
(A) poly(vinyl acetal) resin in an amount of at least 60 wt. % based on the weight of the composition; and
(B) a plasticizer in an amount of at least 5 parts per one hundred parts of said poly(vinyl acetal) resin;
wherein said interlayer composition has a Tg of at least 46.0° and a melt flow index ("MFI") of at least 0.65 grams/10 min when measured at 190° C. at a load of 2.16 kilograms.

There is also provided a composition comprising:
(A) poly(vinyl acetal) ("poly(vinyl acetal)") resin having a weight average molecular weight (Mw) of 160,000 or less, and
(B) a plasticizer in an amount of at least 5 parts per one hundred parts of said poly(vinyl acetal) resin;
wherein said interlayer composition has a Tg of at least 46.0° C.

The composition comprises a poly(vinyl acetal) resin and a plasticizer. Each will be described in more detail.

The poly(vinyl acetal) resin is a thermoplastic resin. It's method of manufacture is not limited. It can be produced by known aqueous or solvent acetalization processes, such as by reacting poly(vinyl alcohol) PVOH with an aldehyde such as butyraldehyde in the presence of an acid catalyst, followed by separation, stabilization, and drying of the resin. Such acetalization processes are disclosed, for example, in U.S. Pat. Nos. 2,282,057 and 2,282,026 and Vinyl Acetal Polymers, in Encyclopedia of Polymer Science & Technology, 3rd edition, Volume 8, pages 381-399 (2003), the entire disclosures of which are incorporated herein by reference.

Poly(vinyl acetal) resins typically have a residual hydroxyl content, an ester content, and an acetal content. As used herein, residual hydroxyl content (calculated as PVOH) refers to the weight percent of moieties having a hydroxyl group remaining on the polymer chains. For example, poly(vinyl acetal) can be manufactured by hydrolyzing poly(vinyl acetate) to PVOH, and then reacting the PVOH with an aldehyde, such as butyraldehyde, propionaldehyde, and the like-, and desirably butyraldehyde, to make a polymer having repeating vinyl butyral units. In the process of hydrolyzing the poly(vinyl acetate), typically not all of the acetate side groups are converted to hydroxyl groups. Further, reaction with butyraldehyde typically will not result in the conversion of all hydroxyl groups on the PVOH to acetal groups. Consequently, in any finished poly(vinyl butyral), there typically will be residual ester groups such as acetate groups (as vinyl acetate groups) and residual hydroxyl groups (as vinyl hydroxyl groups) as side groups on the polymer chain and acetal (e.g. butyral) groups (as vinyl acetal groups). As used herein, residual hydroxyl content is measured on a weight percent basis per ASTM 1396.

An example of a polyvinyl butyral structure is used to further illustrate how the weight percentages are based from the moiety unit to which is bonded the relevant pendant group:

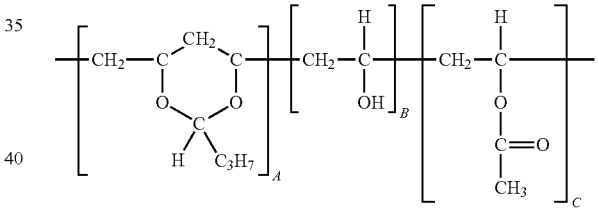

Taking the above structure of a polyvinyl butyral, the butyral or acetal content is based on the weight percentage of the unit A in the polymer, and OH content is based on the weight percentage of the unit B in the polymer (a polyvinyl OH moiety or PVOH), and the acetate or ester content is based on the weight percentage of unit C in the polymer.

Notably, for a given type of plasticizer, the compatibility of the plasticizer in the polymer is largely determined by the hydroxyl content of the polymer. Polymers with greater residual hydroxyl content are typically correlated with reduced plasticizer compatibility or capacity, typically due to the hydrophobicity of the plasticizer being more compatible with fewer hydrophilic groups present on the polymer chain. Conversely, polymers with a lower residual hydroxyl content typically will result in increased plasticizer compatibility or capacity. Generally, this correlation between the residual hydroxyl content of a polymer and plasticizer compatibility/capacity can be manipulated and exploited to allow for addition of the proper amount of plasticizer to the polymer resin and to stably maintain differences in plasticizer content between multiple interlayers.

The hydroxyl group content of the poly(vinyl acetal) resin used to make the composition is not particularly limited, but suitable amounts are from at least about 6, or at least about 8, or at least about 10, or at least about 11, or at least about 12, or at least about 13, or at least about 14, or at least about 15, or at least about 16, or at least about 17, and in each case up to about 35 wt. % PVOH. For example, suitable weight percent (wt. %) hydroxyl groups ranges calculated as PVOH include about 6 to 35, or 6 to 30, or 6 to 25, or 6 to 23, or 6 to 20, or 6 to 18, or 6 to 17, or 6 to 16, or 6 to 15, or 7 to 35, or 7 to 30, or 7 to 25, or 7 to 23, or 7 to 20, or 7 to 18, or 7 to 17, or 7 to 16, or 7 to 15, or 8 to 35, or 8 to 30, or 8 to 25, or 8 to 23, or 8 to 20, or 8 to 18, or 8 to 17, or 8 to 16, or 8 to 15, or 9 to 35, or 9 to 30, or 9 to 25, or 9 to 23, or 9 to 20, or 9 to 18, or 9 to 17, or 9 to 16, or 9 to 15, or 10 to 35, or 10 to 30, or 10 to 25, or 10 to 23, or 10 to 20, or 10 to 18, or 10 to 17, or 10 to 16, or 10 to 15, or 11 to 35, or 11 to 30, or 11 to 25, or 11 to 23, or 11 to 20, or 11 to 18, or 11 to 17, or 11 to 16, or 11 to 15, or 12 to 35, or 12 to 30, or 12 to 25, or 12 to 23, or 12 to 20, or 12 to 18, or 12 to 17, or 12 to 16, or 12 to 15, or 13 to 35, or 13 to 30, or 13 to 25, or 13 to 23, or 13 to 20, or 13 to 18, or 13 to 17, or 13 to 16, or 13 to 15, or 14 to 35, or 14 to 30, or 14 to 25, or 14 to 23, or 14 to 20, or 14 to 18, or 14 to 17, or 14 to 16, or 14 to 15, or 15 to 35, or 15 to 30, or 15 to 25, or 15 to 23, or 15 to 20, or 15 to 18, or 15 to 17, or 15 to 16, or 16 to 35, or 16 to 30, or 16 to 25, or 16 to 23, or 16 to 20, or 16 to 18, or 16 to 17, or 17 to 35, or 17 to 30, or 17 to 25, or 17 to 23, or 17 to 20, or 17 to 18. If desired, the hydroxyl number chosen can be on the lower end of the ranges. In general, a poly(vinyl acetal) polymer having a lower hydroxyl number has the capability of absorbing more plasticizer and absorbing it more efficiently.

The poly(vinyl acetal) resin used to make the monolithic interlayer composition or sheet can also comprise 20 wt. % or less, or 17 wt. % or less, or 15 wt. % or less of residual ester groups, including 13 wt. % or less, or 11 wt. % or less, or 9 wt. % or less, or 7 wt. % or less, or 5 wt. % or less, or 4 wt. % or less residual ester groups calculated as polyvinyl ester, e.g., acetate, with the balance being an acetal, preferably butyraldehyde acetal, but optionally including other acetal groups in a minor amount, for example, a 2-ethyl hexanal group (see, for example, U.S. Pat. No. 5,137,954, the entire disclosure of which is incorporated herein by reference). Suitable ranges of residual ester groups by wt. % include 0 to 20, or 0 to 17, or 0 to 15, or 0 to 13, or 0 to 11, or 0 to 9, or 0 to 7, or 0 to 5, or 0 to 4, or 0 to 20, or 0 to 17, or 0 to 15, or 0 to 13, or 0 to 11, or 0 to 9, or 0 to 7, or 0 to 5, or 0 to 4, or 1 to 20, or 1 to 17, or 1 to 15, or 1 to 13, or 1 to 11, or 1 to 9, or 1 to 7, or 1 to 5, or 1 to 4, or 1 to 20, or 1 to 17, or 1 to 15, or 1 to 13, or 1 to 11, or 1 to 9, or 1 to 7, or 1 to 5, or 1 to 4, or 2 to 20, or 2 to 17, or 2 to 15, or 2 to 13, or 2 to 11, or 2 to 9, or 2 to 7, or 2 to 5, or 2 to 4, or 3 to 20, or 3 to 17, or 3 to 15, or 3 to 13, or 3 to 11, or 3 to 9, or 3 to 7, or 3 to 5, or 3 to 4, or 3 to 20, or 3 to 17, or 3 to 15, or 3 to 13, or 3 to 11, or 3 to 9, or 3 to 7, or 3 to 5, or 3 to 4, or 4 to 20, or 4 to 17, or 4 to 15, or 4 to 13, or 4 to 11, or 4 to 9, or 4 to 7, or 4 to 5, or 6 to 20, or 6 to 17, or 6 to 15, or 6 to 13, or 6 to 11, or 6 to 9. As with the residual hydroxyl group measurement, the weight percent of residual ester groups (e.g. acetate) is based on the moiety in the polymer backbone onto which is linked the acetate group, including the pendant acetate group.

The poly(vinyl acetal) resin used in the invention can also have an acetal content of at least 50 wt. %, or at least 55 wt. %, or at least 60 wt. %, or at least 65 wt. %, or at least 70 wt. %, or at least 75 wt. %, or at least 80 wt. %, or at least 85 wt. %, or at least 90 wt. %, and in each case up to 94 wt. %. Suitable ranges include 50 to 94, or 50 to 93, or 50 to 92, or 50 to 91, or 50 to 90, or 50 to 89, or 50 to 88, or 50 to 86, or 50 to 85, or 55 to 94, or 55 to 93, or 55 to 92, or 55 to 91, or 55 to 90, or 55 to 89, or 55 to 88, or 55 to 86, or 55 to 85, or 60 to 94, or 60 to 93, or 60 to 92, or 60 to 91, or 60 to 90, or 60 to 89, or 60 to 88, or 60 to 86, or 60 to 85, or 65 to 94, or 65 to 93, or 65 to 92, or 65 to 91, or 65 to 90, or 65 to 89, or 65 to 88, or 65 to 86, or 65 to 85, or 70 to 94, or 70 to 93, or 70 to 92, or 70 to 91, or 70 to 90, or 70 to 89, or 70 to 88, or 70 to 86, or 70 to 85, or 75 to 94, or 75 to 93, or 75 to 92, or 75 to 91, or 75 to 90, or 75 to 89, or 75 to 88, or 75 to 86, or 75 to 85, 80 to 94, or 80 to 93, or 80 to 92, or 80 to 91, or 80 to 90, or 89 to 89, or 80 to 88, or 80 to 86, or 80 to 85, 85 to 94, or 85 to 93, or 85 to 92, or 85 to 91, or 85 to 90, or 85 to 89, or 85 to 88, or 85 to 86, or 90 to 94, or 90 to 93, or 90 to 92.

The combination of OH, ester, and acetal ranges is not particularly limited. Some of the range combinations can be those corresponding to the checked boxes in Table 1 below.

TABLE 1

| OH wt. % | Ester wt % | | | | | | | | | | | | | |
|---|---|---|---|---|---|---|---|---|---|---|---|---|---|---|
| | 0-20 | 1-20 | 2-17 | 2-15 | 2-13 | 2-8 | 2-6 | 3-20 | 3-15 | 3-11 | 3-9 | 4-20 | 4-17 | 4-15 |
| 6-25 | X | X | | X | X | X | X | X | X | X | X | X | X | X |
| 7-25 | X | X | | X | | X | X | | | | X | X | X | X |
| 8-25 | X | X | | X | | | | | | | X | | X | X |
| 9-25 | X | X | | X | | | | | | | | | | |
| 10-25 | X | X | | X | | | | | | | | | | |
| 6-23 | | X | X | X | X | X | X | X | X | X | X | X | X | X |
| 8-23 | | X | | X | | | | | | | X | | X | X |
| 9-23 | | X | | X | | | | | | | | | | |
| 6-20 | | X | X | X | X | X | X | X | X | X | X | X | X | X |
| 8-20 | | X | | X | | | | | | | X | | X | X |
| 9-20 | | X | | X | | | | | | | | | | |
| 10-20 | | X | | X | | | | | | | | | | |
| 6-18 | | X | X | X | X | X | X | X | X | X | X | X | X | X |
| 9-18 | | X | | X | | | | | | | | | | |
| 10-18 | | X | | X | | | | | | | | | | |
| 6-15 | | X | X | X | X | X | X | X | X | X | X | X | X | X |
| 8-15 | | X | | X | | | | | | | X | | X | X |
| 10-15 | | X | | X | | | | | | | | | | |
| Acetal Wt. % | 50-94 | 65-89 | 70-92 | 70-88 | 90-92 | 70-91 | 75-91 | 65-91 | 70-91 | 75-91 | 65-89 | 75-89 | 70-88 | 75-88 |

The acetal groups can be vinyl propynal groups, vinyl butyral groups, and the like, and are desirably vinyl butyral groups.

Conventional poly(vinyl acetal) resin for the typical industrial poly(vinyl acetal) monolithic interlayer generally has a molecular weight ($M_w$) of greater than about 180,000, preferably about 185,000 to about 250,000 Daltons, as measured by size exclusion chromatography using low angle laser light scattering (SEC/LALLS) method of Cotts and Ouano in tetra-hydrofuran. However, we have found it beneficial to use poly(vinyl acetal) resins having an Mw of 160,000 or less, or 155,000 or less, or 150,000 or less, or 145,000 or less, or 140,000 or less, or 135,000 or less, or 130,000 or less, or 125,000 or less, or 120,000 or less, or 115,000 or less, or 110,000 or less, or 105,000 or less, or 100,000 or less, or 95,000 or less, or 90,000 or less, or 85,000 or less, or 80,000 or less, and in each case, at least 45,000, or at least 50,000. The term "molecular weight" means the weight average molecular weight ($M_w$). The method for determining the molecular weight as set forth in this description includes using hexafluorisopropanol as the mobile phase (0.8 mL/minute). Each sample is prepared by weighing approximately 20 milligrams of resin into a 25 mL flask and adding 10 mL of the mobile phase. The flask is then placed in an automated shaking device until the polymer is fully dissolved. The analysis is performed using a three-detector system that includes a Viscotek GPCmax (with an autosampler, pump, and degasser), a Viscotek triple detector TDA302 (RALL/LALLS, Viscometer, and DRI combination) with a column oven (commercially available from Malvern Instruments, Malvern, UK). The separation is performed by three Viscotek mixed bed columns, including a type I-MB (one low and two high range molecular weight) maintained at 45° C. The complete detector set up is calibrated using a narrow poly(methyl methacrylate) standard (commercially available from Viscotek) with a reported molecular weight of 93.458, an intrinsic viscosity of 0.615, and a differential index of refraction (dn/dc) value of 0.1875. The refractive index of the mobile phase is 1.2649 and a do/dc value of 0.189 is used for PVB. Viscotek Omnisec 4.7.0 software (commercially available from Malvern Instruments) is used for data calculations.

The lower molecular weight poly(vinyl acetal) resins that can be used in the invention allow one to decrease the amount of plasticizer (which will increase the Tg of the poly(vinyl acetal) resin) while maintaining equivalent or lower extrusion pressures. By lowering the amount of plasticizer used, the E'(storage) modulus can also be increased. Merely lowering the amount of plasticizer to increase the Tg of a conventional molecular weight poly(vinyl acetal) resin renders the resin too difficult to process. Even though we do not see a necessary correlation between the molecular weight and the Tg of the poly(vinyl acetal) resin at equivalent plasticizer loadings, we have found that lowering the molecular weight of the poly(vinyl acetal) resin and lowering the amount of plasticizer allows one to adequately process thermoplastic resins at high Tg values while also providing for an increased E' modulus. Thus, we have found that it is desirable to employ a lower molecular weight poly(vinyl acetal) resin for high Tg applications.

Examples of suitable Mw ranges include 45,000 to 160,000, or 45,000 to 155,000, or 45,000 to 150,000, or 45,000 to 145,000, or 45,000 to 140,000, or 45,000 to 135,000, or 45,000 to 130,000, or 45,000 to 125,000, or 45,000 to 120,000, or 45,000 to 115,000, or 45,000 to 110,000, or 45,000 to 105,000, or 45,000 to 100,000, or 45,000 to 95,000, or 45,000 to 90,000, 50,000 to 160,000, or 50,000 to 155,000, or 50,000 to 150,000, or 50,000 to 145,000, or 50,000 to 140,000, or 50,000 to 135,000, or 50,000 to 130,000, or 50,000 to 125,000, or 50,000 to 120,000, or 50,000 to 115,000, or 50,000 to 110,000, or 50,000 to 105,000, or 50,000 to 100,000, or 50,000 to 95,000, or 50,000 to 90,000, or 60,000 to 160,000, or 60,000 to 155,000, or 60,000 to 150,000, or 60,000 to 145,000, or 60,000 to 140,000, or 60,000 to 135,000, or 60,000 to 130,000, or 60,000 to 125,000, or 60,000 to 120,000, or 60,000 to 115,000, or 60,000 to 110,000, or 60,000 to 105,000, or 60,000 to 100,000, or 60,000 to 95,000, or 60,000 to 90,000, 70,000 to 160,000, or 70,000 to 155,000, or 70,000 to 150,000, or 70,000 to 145,000, or 70,000 to 140,000, or 70,000 to 135,000, or 70,000 to 130,000, or 70,000 to 125,000, or 70,000 to 120,000, or 70,000 to 115,000, or 70,000 to 110,000, or 70,000 to 105,000, or 70,000 to 100,000, or 70,000 to 95,000, or 70,000 to 90,000, 80,000 to 160,000, or 80,000 to 155,000, or 80,000 to 150,000, or 80,000 to 145,000, or 80,000 to 140,000, or 80,000 to 135,000, or 80,000 to 130,000, or 80,000 to 125,000, or 80,000 to 120,000, or 80,000 to 115,000, or 80,000 to 110,000, or 80,000 to 105,000, or 80,000 to 100,000, or 80,000 to 95,000, or 80,000 to 90,000, 90,000 to 160,000, or 90,000 to 155,000, or 90,000 to 150,000, or 90,000 to 145,000, or 90,000 to 140,000, or 90,000 to 135,000, or 90,000 to 130,000, or 90,000 to 125,000, or 90,000 to 120,000, or 90,000 to 115,000, or 90,000 to 110,000, or 90,000 to 105,000, or 90,000 to 100,000, or 100,000 to 160,000, or 100,000 to 155,000, or 100,000 to 150,000, or 100,000 to 145,000, or 100,000 to 140,000, or 100,000 to 135,000, or 105,000 to 160,000, or 105,000 to 155,000, or 105,000 to 150,000, or 105,000 to 105,000, or 105,000 to 140,000, or 105,000 to 135,000, or 105,000 to 130,000, 110,000 to 160,000, or 110,000 to 155,000, or 110,000 to 150,000, or 110,000 to 145,000, or 110,000 to 140,000, or 110,000 to 135,000, or 110,000 to 130,000.

The compositions of the invention are predominately poly(vinyl acetal) types of composition. In this regard, the compositions of the invention contain poly(vinyl acetal) in an amount of at least 60 wt. %, or at least 65 wt. %, or at least 70 wt. %, or at least 75 wt. %, or at least 80 wt. %, or at least 85 wt. %, or at least 90 wt. % or at least 95 wt. %, and in each case up to 98 wt. %. In each case, the poly(vinyl acetal) resin is desirably a polyvinyl butyral resin.

The composition of the invention also contains at least one plasticizer. Plasticizers work by embedding themselves between chains of polymers, spacing them apart (increasing the "free volume") and thus significantly lowering the glass transition temperature ($T_g$) of the polymer resin (typically by 0.5 to 4° C./phr), making the material softer and more flowable. In this regard, the amount of plasticizer in the interlayer can be adjusted to affect the glass transition temperature ($T_g$) values. The glass transition temperature ($T_g$) is the temperature that marks the transition from the glassy state of the interlayer to the elastic state. In general, higher amounts of plasticizer loading will result in lower $T_g$. Conventional, previously utilized monolithic interlayers generally have a $T_g$ in the range of about 0° C. for acoustic (noise reducing) interlayer up to 46° C. for hurricane, structural and aircraft interlayer applications, which at the upper end of the Tg range are difficult to process. An interlayer's glass transition temperature is also correlated with the stiffness of the interlayer: the higher the glass transition temperature, the stiffer the interlayer. Generally, an interlayer with a glass transition temperature of 30° C. or higher increases laminated glass strength and torsional rigidity. A softer interlayer (generally characterized by an interlayer with a glass transition temperature of lower than 30° C.), on the other hand, contributes to the sound dampening effect (i.e., the acoustic characteristics).

The Tg of the interlayers of the invention advantageously have a Tg of at least 46° C., or at least 46.5° C., or at least 47° C., or at least 50.0° C., or at least 51° C., or at least 52° C., or at least 53° C., or at least 54° C., or at least 55° C., or at least 56° C., or at least 57° C., or at least 58° C., or at least 59° C., or at least 60° C. The upper limit is not particularly limited. It can be up to 80° C., or up to 75° C., or up to 70° C., or up to 65° C. Suitable ranges include 46° C.-80° C., or 46° C.-78° C., or 46° C.-75° C., or 46° C.-73° C., or 46° C.-70° C., or 46° C.-68° C., or 46° C.-65° C., or 46° C.-63° C., or 46.5° C.-80° C., or 46.5° C.-78° C., or 46.5° C.-75° C., or 46.5° C.-73° C., or 46.5° C.-70° C., or 46.5° C.-68° C., or 46.5° C.-65° C., or 46.5° C.-63° C., or 47° C.-80° C., or 47° C.-78° C., or 47° C.-75° C., or 47° C.-73° C., or 47° C.-70° C., or 47° C.-68° C., or 47° C.-65° C., or 47° C.-63° C., or 50° C.-80° C., or 50° C.-78° C., or 50° C.-75° C., or 50° C.-73° C., or 50° C.-70° C., or 50° C.-68° C., or 50° C.-65° C., or 50° C.-63° C., 51° C.-80° C., or 51° C.-78° C., or 51° C.-75° C., or 51° C.-73° C., or 51° C.-70° C., or 51° C.-68° C., or 51° C.-65° C., or 51° C.-63° C., 53° C.-80° C., or 53° C.-78° C., or 53° C.-75° C., or 53° C.-73° C., or 53° C.-70° C., or 53° C.-68° C., or 53° C.-65° C., or 53° C.-63° C., 55° C.-80° C., or 55° C.-78° C., or 55° C.-75° C., or 55° C.-73° C., or 55° C.-70° C., or 55° C.-68° C., or 55° C.-65° C., or 55° C.-63° C., 57° C.-80° C., or 57° C.-78° C., or 57° C.-75° C., or 57° C.-73° C., or 57° C.-70° C., or 57° C.-68° C., or 57° C.-65° C., or 57° C.-63° C.

The glass transition temperature (Tg) is determined by rheometric dynamic analysis using the following procedure. The poly(vinyl acetal) sheet is molded into a sample disc of 25 millimeters (mm) in diameter. The poly(vinyl acetal) sample disc is placed between two 25 mm diameter parallel plate test fixtures of a Rheometrics Dynamic Spectrometer II. The poly(vinyl acetal) sample disc is tested in shear mode at an oscillation frequency of 1 Hertz as the temperature of the poly(vinyl acetal) sample is increased from −20 to 70° C. at a rate of 2° C./minute. The position of the maximum value of tan delta (damping) plotted as dependent on temperature is used to determine Tg. Experience indicates that the method is reproducible to within +/−1° C.

As used herein, the amount of plasticizer, or any other component in the interlayer, can be measured as parts per hundred parts resin (phr), on a weight per weight basis. For example, if 30 grams of plasticizer is added to 100 grams of polymer resin, then the plasticizer content of the resulting plasticized polymer would be 30 phr. As used herein, when the plasticizer content of the interlayer is given, the plasticizer content is determined with reference to the phr of the plasticizer in the melt that was used to produce the interlayer.

The interlayer comprises at least 5, or at least 8, or at least 10, or at least 13, or at least 15, or at least 17, or at least 20, and up to 28, or up to 25, or up to 23, or up to 20, or up to 18, or up to 17, or up to 15, or up to 13, or up to 10, or up to 9, or up to 8, or up to 7 parts plasticizer per hundred parts of poly(vinyl acetal) resin ("phr"). Suitable ranges of plasticizer in phr within a layer include 5 to 28, or 5 to 25, or 5 to 23, or 5 to 20, or 5 to less than 20, or 5 to 19, or 5 to 18, or 5 to 17, or 5 to 15, or 5 to 13, or 5 to 10, or 5 to 9, or 5 to 8, or 5 to 7, 8 to 28, or 8 to 25, or 8 to 23, or 8 to 20, or 8 to less than 20, or 8 to 19, or 8 to 18, or 8 to 17, or 8 to 15, or 8 to 13, or 8 to 10, or 10 to 28, or 10 to 25, or 10 to 23, or 10 to 20, or 10 to less than 20, or 10 to 19, or 10 to 18, or 10 to 17, or 10 to 15, or 10 to 13, or 13 to 28, or 13 to 25, or 13 to 23, or 13 to 20, or 13 to less than 20, or 13 to 19, or 13 to 18, or 13 to 17, or 13 to 15, or 15 to 28, or 15 to 25, or 15 to 23, or 15 to 20, or 15 to less than 20, or 15 to 19, or 15 to 18, or 15 to 17, or 17 to 28, or 17 to 25, or 17 to 23, or 17 to 20, or 17 to less than 20, or 17 to 19, or 17 to 18, 20 to 28, or 20 to 25, or 20 to 23, or 23 to 28, or 23 to 25.

Since a reduction in the amount of plasticizer present in the composition of the invention contributes toward an increase in Tg and stiffness, it is desirable to use 20 or less, or less than 20, or 19 or less, or 18 or less, and at least 5 or at least 8, in each case parts plasticizer per hundred parts of poly(vinyl acetal) resin. For example, the amount of plasticizer is desirably 5 to 20, or 5 to less than 20, or 5 to 19, or 5 to 18, or 5 to 17, or 5 to 16, or 5 to 15, or 8 to 20, or 8 to less than 20, or 8 to 19, or 8 to 18, or 8 to 17, or 8 to 16, or 8 to 15, or 10 to 20, or 10 to less than 20, or 10 to 19, or 10 to 18, or 10 to 17, or 10 to 16, or 10 to 15, in each case parts per hundred parts of poly(vinyl acetal) resin. Any ranges at an upper end of less than 20 phr are particularly desirable as these amounts tend to enhance the Tg of the interlayer.

The adjustments in the amount of plasticizer are made possible by the use of polymers having a lower molecular weight, and the reduced amount of plasticizer allows one to make a higher Tg interlayer sheet, while the lower molecular weight poly(vinyl acetal) resin also allows one to make the sheet at acceptable rates. The adjustment between the selection of molecular weight and the amount of plasticizer allows one to take advantage of a variety of properties and opens up large processing and application windows. For example, if a particular application does not require a high end Tg, the invention allows one to increase the amount of plasticizer to further improve the flowability of the polymer and increase the output (capacity) of the extruder while maintaining a compositional Tg of at least 46° C. Alternatively, with an increase in flowability, the capacity or output of the extruder can be maintained constant while decreasing the extrusion temperature, thereby saving on energy costs. The extrusion temperature is the temperature of the polymer at the entrance to the die head. If none of these objectives are paramount and maximizing the Tg of the interlayer is desired, as noted above, the amount of plasticizer can be reduced to a lower end of the range, made possible with the use of lower molecular weight polymers, while maintaining reasonable polymer flowability at extrusion temperatures not exceeding 240° C., or even not exceeding 235° C., or even not exceeding 230° C. By maintaining extrusion temperatures not exceeding 240° C., the formation of undesirable degradation by-products is minimized.

The type of plasticizer used is not particularly limited. The plasticizer can be a compound having a hydrocarbon segment of 30 or less, or 25 or less, or 20 or less, or 15 or less, or 12 or less, or 10 or less carbon atoms, and in each case at least 6 carbon atoms. Suitable conventional plasticizers for use in these interlayers include esters of a polybasic acid or a polyhydric alcohol, among others. Suitable plasticizers include, for example, triethylene glycol di-(2-ethylhexanoate) ("3GEH"), triethylene glycol di-(2-ethylbutyrate), triethylene glycol diheptanoate, tetraethylene glycol diheptanoate, dihexyl adipate, dioctyl adipate, hexyl cyclohexyladipate, diisononyl adipate, heptylnonyl adipate, dibutyl sebacate, butyl ricinoleate, castor oil, dibutoxy ethyl phthalate, diethyl phthalate, dibutyl phthalate, trioctyl phosphate, triethyl glycol ester of coconut oil fatty acids, phenyl ethers of polyethylene oxide rosin derivatives, oil modified sebacic alkyd resins, tricresyl phosphate, and mixtures thereof. A desirable plasticizer is 3GEH.

High refractive index plasticizers may be used in the composition of the invention, either alone or in combination with another plasticizer. Examples of the high refractive index plasticizers include, but are not limited to, esters of a polybasic acid or a polyhydric alcohol, polyadipates, epoxides, phthalates, terephthalates, benzoates, toluates, mellitates and other specialty plasticizers, among others. Examples of high refractive index plasticizers include, but are not limited to, dipropylene glycol dibenzoate, tripropylene glycol dibenzoate, polypropylene glycol dibenzoate, isodecyl benzoate, 2-ethylhexyl benzoate, diethylene glycol benzoate, propylene glycol dibenzoate, 2,2,4-trimethyl-1,3-pentanediol dibenzoate, 2,2,4-trimethyl-1,3-pentanediol benzoate isobutyrate, 1,3-butanediol dibenzoate, diethylene glycol di-o-toluate, triethylene glycol di-o-toluate, dipropylene glycol di-o-toluate, 1,2-octyl dibenzoate, tri-2-ethylhexyl trimellitate, di-2-ethylhexyl terephthalate, bis-phenol A bis(2-ethylhexaonate), ethoxylated nonylphenol, and mixtures thereof. Examples of more preferred high refractive index plasticizers are dipropylene glycol dibenzoates and tripropylene glycol dibenzoates.

In addition to the use of a plasticizer, various adhesion control agents ("ACAs") can be used with the poly(vinyl acetal) resins and in the sheets of the invention. ACAs in the monolithic interlayer formulation control adhesion of the sheet to glass to provide energy absorption on impact of the glass laminate. In various embodiments of interlayers of the present disclosure, the interlayer can comprise about 0.003 to about 0.15 parts ACAs per 100 parts resin; about 0.01 to about 0.10 parts ACAs per 100 parts resin; and about 0.01 to about 0.04 parts ACAs per 100 parts resin. Such ACAs, include, but are not limited to, the ACAs disclosed in U.S. Pat. No. 5,728,472 (the entire disclosure of which is incorporated herein by reference), residual sodium acetate, potassium acetate, magnesium bis(2-ethyl butyrate), and/or magnesium bis(2-ethylhexanoate).

Anti-blocking agents may also be added to the composition of the present invention to reduce the level of blocking of the interlayer. Anti-blocking agents are known in the art, and any anti-blocking agent that does not adversely affect the properties of the interlayer may be used. A particularly preferred anti-blocking agent that can be successfully used as in the polymer sheet while not affecting optical properties of the sheet or the adhesive properties of the sheet to glass is a fatty acid amide (see, for example, U.S. Pat. No. 6,825,255, the entire disclosure of which is incorporated herein).

Other additives may be incorporated into the composition to enhance its performance in a final product and impart certain additional properties to the interlayer. Such additives include, but are not limited to, dyes, pigments, stabilizers (e.g., ultraviolet stabilizers), antioxidants, flame retardants, IR absorbers or blockers (e.g., indium tin oxide, antimony tin oxide, lanthanum hexaboride ($LaB_6$) and cesium tungsten oxide), processing aides, flow enhancing additives, lubricants, impact modifiers, nucleating agents, thermal stabilizers, UV absorbers, UV stabilizers, dispersants, surfactants, chelating agents, coupling agents, adhesives, primers, reinforcement additives, and fillers, among other additives known to those of ordinary skill in the art.

The monolithic interlayer composition has a melt flow index ("MFI") of at least 0.65 grams/10 minutes at 190° C. and under a load of 2.16 kilograms. The molecular weight of the poly(vinyl acetal) resin and the amount of plasticizer can be adjusted to provide an MFI of at least 0.65. At these MFI levels, the interlayer composition/molten thermoplastic is reasonably flowable and within a commercially acceptable output during extrusion. The high MFI of the composition with lowered molecular weight resin provides a wider processing window while providing a sheet that has improved stiffness and Tg. The MFI is at least 0.65, or can be at least 0.70, or at least 0.80, or at least 0.90, or at least 1, or at least 1.1, or at least 1.2, or at least 1.4, or at least 1.5, or at least 1.8, or at least 2, or at least 3, or at least 5, or at least 7, or at least 10, each expressed as g/10 min. While there is no particular upper limit, for practical considerations, such as retaining mechanical strength, the MFI should not exceed 40, or should not exceed 30, or should not exceed 25, each expressed as g/10 min. If the MFI is too low, processability becomes too difficult at commercially useful rates. If the MFI is excessively high, the mechanical properties of the sheet can deteriorate to the extent that the monolithic interlayer does not provide a commercially useful panel. Suitable ranges include 0.65-40, or 0.65-30, or 0.65-25, or 0.7-40, or 0.7-30, or 0.7-25, or 0.8-40, or 0.8-30, or 0.8-25, or 0.9-40, or 0.9-30, or 0.9-25, or 1-40, or 1-30, or 1-25, or 1.1-40, or 1.1-30, or 1.1-25, or 1.2-40, or 1.2-30, or 1.2-25, or 1.4-40, or 1.4-30, or 1.4-25, or 1.5-40, or 1.5-30, or 1.5-25, or 1.8-40, or 1.8-30, or 1.8-25, or 2-40, or 2-30, or 2-25, or 3-40, or 3-30, or 3-25, or 5-40, or 5-30, or 5-25, or 7-40, or 7-30, or 7-25, or 10-40, or 10-30, or 10-25. The MFI of the composition of the invention is determined according to ASTM D1238-13, Procedure A.

The monolithic interlayer composition can have a solution viscosity of 120 cps or less. The molecular weight of the poly(vinyl acetal) resin and the amount of plasticizer can be adjusted to provide a solution viscosity of the thermoplastic composition (that includes resin and plasticizer) of 125 cps or less. The solution viscosity as used herein is determined by placing the sheet samples in a crucible overnight to dry; determining the sheet sample weight by formula: Wt. sheet=3.195 (100+phr)/100; placing the sheet in 4 oz. bottle with 39.57 g Methanol to dissolve; placing the bottle in a constant temperature water bath at 20+/−0.1 degree C. for 1 hour but not to exceed 1.5 hours, placing a viscometer (e.g. Cannon No. 400) in water bath for 5 min. to equilibrate, transferring 10 mls of solution to viscometer by pipette; and timing the solution flow between viscometer marks; then multiplying the time (sec.) with the Viscometer factor to determine viscosity in cps (1.038 for the Cannon No. 400). Suitable solution viscosities of the interlayer composition and thermoplastic composition include, in centipoise, 125 or less, 120 or less, or 110 or less, or 100 or less, or 90 or less, or 85 or less, or 80 or less, or 70 or less, or 65 or less, or 60 or less, or 55 or less, or 50 or less, or 45 or less, or 40 or less, or 35 or less, or 30 or less. Additionally or in the alternative, the solution viscosity is at least 5 cps, or at least 10 cps. Suitable ranges of solution viscosity include, in cps, 5-125, or 10-125, or 5-120, or 10-120, or 5-110, or 10-110, or 5-100, or 10-10, or 5-95, or 10-95, or 5-90, or 10-90, or 5-85, or 10-85, or 5-80, or 10-80, or 5-70, or 10-70, or 5-65, or 10-65, or 5-60, or 10-60, or 5-55, or 10-55, or 5-50, or 10-50, or 5-45, or 10-45, or 5-40, or 10-40, or 5-35, or 10-35, or 5-30, or 10-30.

Co-additives such as anti-blocking agents, colorants and UV inhibitors (in liquid, powder, or pellet form) are often used and can be mixed into the thermoplastic resin or plasticizer prior to arriving in the extruder device or combined with the thermoplastic resin inside the extruder device. These additives are incorporated into the thermoplastic composition, and by extension the resultant monolithic interlayer sheet, to enhance certain properties of the interlayer sheet and its performance in a multiple layer glass panel product (or photovoltaic module).

Any of the compositions of the invention described above can comprise a monolithic interlayer sheet.

The monolithic interlayer sheet can be made by any suitable process known to one of ordinary skill in the art of producing interlayer sheets. For example, it is contemplated that the monolithic interlayer sheets may be formed through dipcoating, solution casting, compression molding, injection molding, melt extrusion, melt blowing or any other procedures for the production and manufacturing of an interlayer sheet known to those of ordinary skill in the art.

In one method, the monolithic interlayer sheets can be made by any conventional sheet extrusion device. The extruder can be a single or twin screw extruder. There is now also provided a process in which a monolithic poly(vinyl acetal) sheet can be made by:
 (i) providing an extrusion system comprising die and an extruder having a barrel;
 (ii) feeding a poly(vinyl acetal) resin and a plasticizer into the barrel and passing a molten thermoplastic composition comprising said poly(vinyl acetal) resin and plasticizer through the extruder and the die to produce an extruded sheet, wherein the melt flow index of said molten thermoplastic resin is at least 0.65 g/10 min when measured at 190° C. at a loading of 2.16 kilograms, and
 (iii) cooling said sheet to produce a monolithic interlayer sheet having a Tg of at least 46.0° C.

Figure 2:
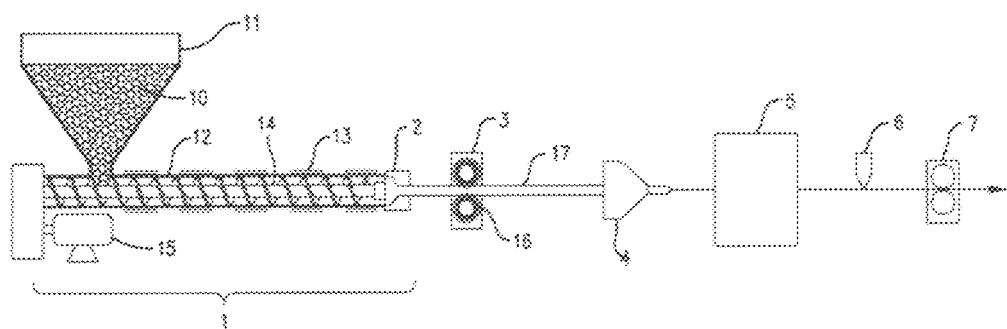
FIG. 2 is a diagram of an extrusion system.

Reference to FIG. 2 is made to further illustrate the process of the invention along with additional features.

As illustrated, there is provided an extrusion system made up of an extruder 1, a filter 2, a die 4, and a melt pump 3 disposed between the filter 2 and the die 4.

In the extruder device 1, the particles of the thermoplastic composition 10 comprising poly(vinyl acetal) resin and plasticizers, and other additives described above, are fed through a feed system 11 (e.g. hopper) into the barrel 12 of the extruder 1 and heated by heating elements 13 to form a molten thermoplastic composition in the barrel 12 that is generally uniform in temperature and composition. Generally, in the extrusion process, thermoplastic resin and plasticizers, including any of those resins and plasticizers described above, are pre-mixed and fed into an extruder device. For example, the process of the invention can include feeding a pre-mix into an extruder 1, wherein the pre-mix is obtained by combining a thermoplastic poly(vinyl acetal) resin and a plasticizer, and optionally other additives first to make a pre-mix, and feeding the pre-mix to the barrel 12. This method is particularly useful when using a single screw extruder. Alternatively, there can be provided at least two streams fed to the barrel 12 of an extruder (not shown), one stream comprising a poly(vinyl acetal) thermoplastic resin and a second stream comprising a plasticizer, combining the two streams inside the barrel of an extruder. This technique is particularly useful when using a twin-screw extruder. The at least two streams can be combined inside the extruder by melting the poly(vinyl acetal) resin inside the extruder in the presence of the plasticizer.

The thermoplastic particles are propelled down the barrel 12 through the action of the rotating screw 14 powered by a motor 15, and with a combination of shear forces and heat, melts the thermoplastic solids within the barrel 12 into a molten thermoplastic composition that is propelled through a filter 2 to filter out particles. Passage through a filter 2 is a cause for pressure drop, and to compensate, a melt pump 3, such as a gear pump, can be located between the filter 2 and die 4. The extruder die 4 is the component of the thermoplastic extrusion process which gives the final monolithic interlayer sheet product its profile. A plurality of shapes can be imparted to the end monolithic interlayer sheet by the die so long as a continuous profile is present.

The thermoplastic composition of the invention is desirably brought to a temperature of 240° C. or less within the barrel 12. When the composition experiences temperatures higher than 240° C., there is generally a risk of significant build-up of yellow color because poly(vinyl acetal) resins tend to form decomposition by-products at higher temperatures. The molten thermoplastic polymer composition is desirably brought to a temperature within the barrel 12 of 240° C. or less, or 238° C. or less, or 235° C. or less, or 233° C. or less, or 232° C. or less, or 230° C. or less, or 228° C. or less, or 226° C. or less, or 225° C. or less, or 220° C. or less, and in each case at a temperature of at least 150° C.

The molten thermoplastic composition is fed from the outlet 16 of the melt pump 3 and fed through a line 17 to a die 4. In this illustration, the thermoplastic composition experiences a pressure drop between the outlet 16 of the melt pump and the exit to the die 4, and the magnitude of the pressure drop affects the throughput and capacity of the extrusion process. As the flowability of the thermoplastic composition increases so does the throughput of the extrusion device. The flowability of the thermoplastic composition will manifest itself by the pressure drop between the melt pump and the exit of the die. Since the thermoplastic compositions of the invention are flowable even with low amounts of plasticizer made possible by the use of low Mw poly(vinyl acetal) resins, it is now possible to process the thermoplastic resin in a commercially acceptable manner while obtaining an interlayer sheet having high Tg. In the process of the invention, a reasonable pressure drop across the melt pump outlet and the die exit is obtainable while simultaneously obtaining an interlayer sheet having a Tg of 46 or more or 50.0° C. or more made at acceptable extrusion rates.

The flowability of the thermoplastic composition in the extruder can be expressed as a composition having a high MFI at the conditions in the extruder. The MFI of the thermoplastic composition in the process of the invention can be at least 0.65 grams/10 min when measured at 190° C. at a loading of 2.16 kilograms.

The monolithic interlayer at the state after the extrusion die forms the melt into a continuous profile will be referred to as an "extruded sheet." At this stage in the process, the extrusion die has imparted a particular profile shape to the thermoplastic composition, thus creating the extruded sheet. The extruded sheet is highly viscous throughout. At least a portion or the whole of the extruded sheet as it exits the die is molten. In the extruded sheet, the thermoplastic composition as it exits the die has not yet been cooled to a temperature at which the sheet generally completely "sets." Thus, after the extruded sheet leaves the extrusion die, generally the next step is to cool the polymer melt sheet with a cooling device 5 to make a monolithic interlayer sheet having a Tg of at least 46.0° C. Cooling devices include, but are not limited to, spray jets, fans, cooling baths, and cooling rollers. The cooling step functions to set the extruded sheet into a monolithic interlayer sheet of a generally uniform non-molten cooled temperature. In contrast to the extruded sheet, this monolithic interlayer sheet is not in a molten state. Rather, it is the set final form cooled monolithic interlayer sheet product. Once the interlayer sheet has been cooled and set, it is cut with knives 6 and pulled through with a roller/winding system 7.

The thickness, or gauge, of the monolithic interlayer sheet is not particularly limited and will depend upon the desired application. Examples of suitable thicknesses where the application will only utilize a monolithic interlayer sheet in a glass panel are at least 5 mils, or at least 10 mils, or at least 15 mils, and can be as thick as desired. The sheet can be as thick as 90 mils, or 120 mils, or more depending on the desired application. Examples of ranges include from about 5 mils to 120 mils (0.12 mm to 3.03 mm), or 15 mils to 90 mils (about 0.38 mm to about 2.286 mm), or about 30 mils to about 60 mils (about 0.762 to 1.52 mm), or about 15 mils to about 35 mils (about 0.375 to about 0.89 mm). In other applications, the thickness, or gauge, of the monolithic interlayer sheet can be greater than 60 mils (1.52 mm) as desired for the particular application.

As used herein, a multiple layer panel can comprise a single substrate, such as glass, acrylic, or polycarbonate with a monolithic interlayer sheet disposed thereon, and most commonly, with a thin polymer film further disposed over the monolithic interlayer. The combination of monolithic interlayer sheet and polymer film is commonly referred to in the art as a bilayer. A typical multiple layer panel with a bilayer construct is: (glass)//(monolithic interlayer sheet)//(polymer film). The polymer film supplies a smooth, thin, rigid substrate that affords better optical character than that usually obtained with a monolithic interlayer sheet alone and functions as a performance enhancing layer. Polymer films differ from monolithic interlayer sheets, as used herein, in that polymer films are not poly(vinyl acetal) films and do not themselves provide the necessary penetration resistance and glass retention properties, but rather provide performance improvements, such as infrared absorption characteristics. Poly(ethylene terephthalate) ("PET") is the most commonly used polymer film. Generally, a polymer film is thinner than a polymer sheet. The polymer film typically has a thickness from about 0.001 to 0.2 mm thick.

Further, the multiple layer panel can be double paned with a construct such as: (glass)//(monolithic interlayer)//(glass); or (glass)//(monolithic interlayer)//polymer film//(monolithic interlayer)//(glass).

The interlayers of the present disclosure will most commonly be utilized in multiple layer panels comprising two substrates, preferably a pair of glass sheets, with the interlayers disposed between the two substrates. An example of such a construct would be: (glass) II (monolithic interlayer sheet) II (glass), where the monolithic interlayer sheet can comprise multilayered interlayers, as noted above, and wherein at least one of the interlayers comprises a poly(vinyl acetal) sheet made by the method of the invention.

The typical glass lamination process comprises the following steps: (1) assembly of the two substrates (e.g., glass) and interlayer; (2) heating the assembly via an IR radiant or convective means for a short period; (3) passing the assembly into a pressure nip roll for the first deairing; (4) heating the assembly a second time to about 50° C. to about 120° C. to give the assembly enough temporary adhesion to seal the edge of the interlayer; (5) passing the assembly into a second pressure nip roll to further seal the edge of the interlayer and allow further handling; and (6) autoclaving the assembly at temperatures between 135° C. and 150° C. and pressures between 150 psig and 200 psig for about 30 to 90 minutes.

Other means for use in de-airing of the interlayer-glass interfaces (steps 2 to 5) known in the art and that are commercially practiced include vacuum bag and vacuum ring processes in which a vacuum is utilized to remove the air.

An alternate lamination process involves the use of a vacuum laminator that first de-airs the assembly and subsequently finishes the laminate at a sufficiently high temperature and vacuum.

Since the monolithic interlayer sheets have such a high Tg, the application windows open up to allow for their use in a wider variety of applications. For example, the monolithic interlayer can be used in demanding structural applications, especially where the temperatures may exceed room temperature (25-30° C.). Examples include balustrades, curtain walls, flooring, and the like The monolithic interlayer of the invention also can now be used in applications which require maintaining good modulus at higher temperatures, such as outdoor applications that undergo regular intermittent stresses, caused by such factors as walking or running, or that are load bearing under temperature conditions that may exceed 35° C. Examples of applications in which the monolithic interlayer of the invention is suited include outdoor stairs, outdoor platforms, pavement or sidewalk skylights, and the like.

The monolithic interlayer of the invention desirably has a storage modulus E' at 40° C. of at least 300,000,000 pascals, or at least 400,000,000 pascals, or at least 500,000,000 pascals, or at least 600,000,000 pascals, or at least 700,000,000 pascals, or at least 800,000,000 pascals. There is no particular upper limit, although practically the monolithic interlayer can obtain an E' modulus as high as 3,000,000,000 pascals, or as high as 2,000,000,000 pascals, or as high as 1,500,000,000 pascals at 40° C.

The monolithic interlayer of the invention desirably also, or in the alternative, has a storage modulus $E^{t}$ at 50° C. of at least 6,000,000 pascals, or at least 7,000,000 pascals, or at least 8,000,000 pascals, or at least 9,000,000 pascals, or at least 10,000,000 pascals, or at least 20,000,000 pascals, or at least 30,000,000 pascals, or at least 40,000,000 pascals, or at least 50,000,000 pascals, or at least 60,000,000 pascals, or at least 70,000,000 pascals, or at least 80,000,000 pascals, or at least 90,000,000 pascals, or at least 100,000,000 pascals. There is no particular upper limit, although practically the monolithic interlayer can obtain an E' modulus as high as 1,000,000,000 pascals, or as high as 900,000,000 pascals, or as high as 800,000,000 pascals at 50° C.

The storage E' modulus of the monolithic interlayer is measured according to ASTM D5026-06 (Reapproved 2014). The E' modulus is obtained by the Dynamic Mechanical Analysis using the RSA-II instrument. A 9 mm wide and 0.765 mm thick sample is clamped at the top and bottom and placed in tension. The length of the sample between the clamps is 22 mm. A sinusoidal tensile strain of magnitude 0.01% is applied at a frequency of 1 Hz to the specimen over a range of temperatures and the resulting stress response is measured. Modulus which is a measure of resistance of the material to deformation is obtained from the ratio of stress to strain. For an oscillatory tensile deformation, E' is the real part of the complex modulus and is referred to as the storage modulus. Temperature control is provided by an oven chamber and the heating rate is 3 C/minute.

Glass panels made with the monolithic interlayers of the invention have the capability of maintaining acceptable levels of creep resistance, which is 1 mm or less, even at the low poly(vinyl acetal) resins molecular weights. Glass panels containing the monolithic interlayers of the invention can exhibit a creep of not more than 1 mm at 100° C. and at 1000 hours, or nor more than 0.9 mm, or not more than 0.8 mm, or not more than 0.7 mm, or not more than 0.6 mm, or not more than 0.5 mm, or not more than 0.4 mm.

The method for determining creep resistance is to laminate the monolithic interlayer between two sheet of glass, one sheet measuring 6"×6" and the other 6"×7". The glass panel test specimen is hung by the exposed 1" section of glass in an oven set at 100° C. The test specimen is then removed at the predetermined intervals and measured to determine how much of the 6"×6" piece of glass has slipped down from its original position relative to the 6"×7" glass. The predetermined intervals are at 100, 250, 500, and 1000 hours.

EXAMPLES

A laboratory extrusion trial was conducted using a 1.25" extruder outfitted with an extrusion die. The extrusion system is outfitted with a filter at the head of the extruder, followed by a gear pump, followed by the die, and the speed of the gear pump was held constant at 44 rpm for all examples. The extrusion rate was measured over the course of the test and was approximately 47-48 g/min for all examples.

S-2075 plasticizer (3GEH) was used in all cases, at varying levels as described in the table below. The same amount of adhesion control agents was added in all cases in the premix.

Pressure transducers were mounted at the outlet of the gear pump. The pressure at the gear pump relative to the control illustrates the effect of lowering the molecular weight of the PVB resin.

A control Saflex™ DG41 sheet was used to measure Tg and compare with the experimental cases. Saflex™ DG41 is a commercial product for structural applications, and was used because it is available in the marketplace.

Table 2 below lists the effect of resin type and plasticizer loading on the pressure at the outlet of the gear pump, as well as the Tg of the interlayer for each case. The gear pump pressure is an indicator of an improvement in flowability of the thermoplastic resin in an extrusion environment.

and that this can be achieved at acceptable rates (as indicated by the lower pressure drop). Examples 4, 5 and 6, which employ a lower MW resin and lower amounts of plasticizer, produce a sheet having a high Tg exceeding 50° C. In addition, the increase in Tg is not at the expense of acceptable rates as indicated by pressure drops at about the same amount as the control or lower.

Example 3, with a lower MW resin and equivalent plasticizer as Examples 1 and 2, demonstrates that the molecular weight of the resin allows for a lower pressure at the gear pump due to improved flowability as indicated by its higher MFI value of 1.4 (compared to Example 1 at 0.57). Example 6 also demonstrates the same point where the pressure reduction at the gear pump is about 79% relative to Example 1 due to its dramatically higher MFI at 20 and about 78% relative to Example 2.

Examples 4, 5 and 6 demonstrate that higher Tg monolithic poly(vinyl acetal) interlayers can be extruded at lower or almost equivalent pressure drop as Example 2. As the pressure at the gear pump starts to increase due to further drops in the plasticizer level as can be seen in Example 5, the flowability of the thermoplastic resin can be improved by continuing to lower the molecular weight of the resin to compensate for the low plasticizer levels as seen in Example 6. This effect can be seen in Example 6 that has the same low plasticizer level as Example 5, yet has a significantly improved flowability as indicated by its low pressure requirement and higher MFI, compared to all other examples, at the gear pump due to the reduction in molecular weight.

The examples 3-6 indicate the effect of improved flowability by higher MFI values compared to the control Examples 1 employing a resin of higher Mw. While the MFI starts to decrease as the amount of plasticizer is lowered (examples 3-5), the MFI remains higher than the control and can be dropped further by employing a resin of lower Mw at the low plasticizer levels.

TABLE 2

| Example | PVB Resin Weight Average MW | Plasticizer (phr) | Gear Pump Outlet Pressure (psi) | Glass Transition Temperature Tg (° C.) | MFI (190/2.16) | Solution Viscosity |
|---|---|---|---|---|---|---|
| 1 (control) Saflex ™ DG41 | 170 | 20 | 4466 | 46.1 | 0.57 | 155 |
| 2 (control) | 170 | 20 | 4240 | 46.2 | Not analyzed | Not analyzed |
| 3 | 130 | 20 | 3000 | 45.8 | 1.40 | 84.3 |
| 4 | 130 | 15 | 3700 | 51.5 | 1.03 | 97.6 |
| 5 | 130 | 10 | 4390 | 58.8 | 0.70 | 82.4 |
| 6 | 50 | 10 | 920 | 60.1 | 20 | 14.9 |

It can be seen that Example 2 demonstrates essentially the same glass transition temperature as the control sheet of Example 1 (46.2° C. v. 46.1° C.). Example 3 demonstrates almost the same glass transition temperature (45.8° C.) as Examples 1 and 2, showing that Tg is not a function of the molecular weight of the poly(vinyl acetal) resin. Similarly, a comparison of Example 5 and Example 6 also demonstrates that the Tg is not a function of the resin molecular weight since both are plasticized at the same level (10 phr) and have similar Tg (58.8° C. v. 60.1° C.).

However, the examples do demonstrate that with a lower molecular weight resin, the amount of plasticizer can be reduced, which in turn elevates the Tg of the composition, Finally, the very low pressure of Example 6 suggests that the resin of Example 6 can be used in blends with higher molecular weight resins to control process conditions while achieving a higher Tg product.

The rheological properties of the interlayer sheets made in Examples 1-6 were also studied. FIG. 1 shows that the sheets of Examples 3, 4, 5 and 6 possess significantly higher storage modulus E' at all temperatures of 30° C. or more, such as at 40° C. and 50° C. and within the range of 30-65° C., or 30-60° C., or 30-55° C., and the differences were quite large at 40-55° C., or 40-50° C. The modulus is also higher at temperatures of 50-55° C., suggesting that these formulations perform better than control Examples 1 and 2 in structural applications that may be exposed to higher than room temperature conditions.

Figure 3:
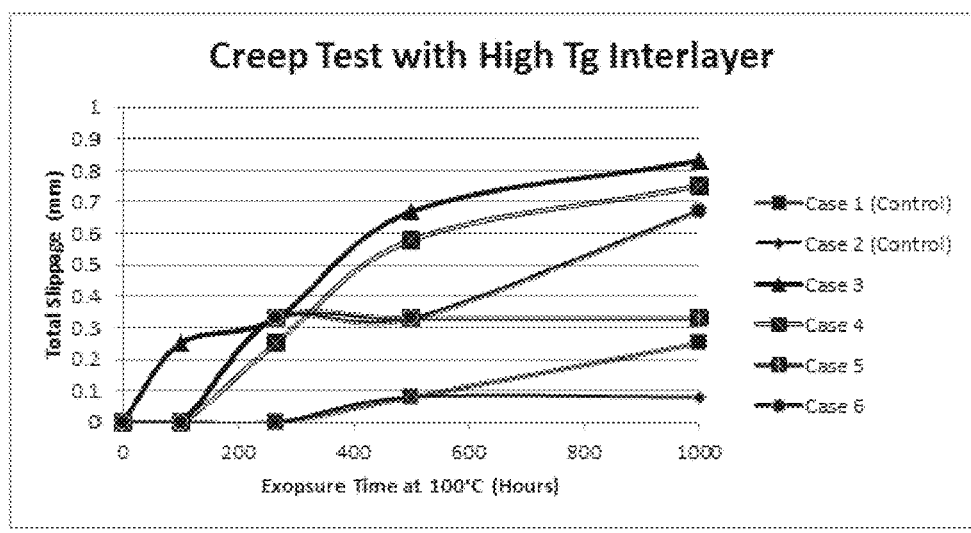
FIG. 3 is a graphical illustration of the creep resistance of examples 1-6.

Each of the examples 1-6 were subjected to the creep resistance test described above. The results are set forth as illustrated graphically in FIG. 3. As can be seen from FIG. 3, all test specimens made from the interlayers of the invention (3-6) maintained a creep resistance of under 1 mm in spite of using lower Mw poly(vinyl butyral) resins.

It is intended that the invention not be limited to the particular embodiments disclosed as the best mode contemplated for carrying out this invention, and that the invention will include all embodiments falling within the scope of the appended claims.

It will further be understood that any of the ranges, values, or characteristics given for any single component of the present invention can be used interchangeably with any ranges, values, or characteristics given for any of the other components of the invention, where compatible, to form an embodiment having defined values for each of the components, as given herein throughout.

What we claim is:

1. A monolithic interlayer sheet formed from a composition comprising:
   (A) poly(vinyl acetal) resin in an amount of at least 60 wt. % based on the weight of the composition; and
   (B) a plasticizer in an amount of from 5 to 9 parts per one hundred parts of said poly(vinyl acetal) resin;
   wherein said composition has a Tg of at least 46° C. and a melt flow index ("MFI") of at least 0.65 grams/10 minutes when measured at 190° C. at a load of 2.16 kilograms, the Mw of poly(vinyl acetal) resin in the interlayer sheet does not exceed 150,000, and the interlayer sheet has a thickness of at least 15 mils.

2. The interlayer sheet of claim 1, wherein said composition has a Tg of at least 50° C.

3. The interlayer sheet of claim 1, wherein said composition has a Tg of at least 55° C.

4. The interlayer sheet of claim 1, wherein the monolithic interlayer sheet has a thickness from 30 mils to 60 mils.

5. The interlayer sheet of claim 1, wherein the monolithic interlayer sheet has a thickness greater than 60 mils.

6. The interlayer sheet of claim 1, wherein said composition has a Tg of at least 60° C.

7. The interlayer sheet of claim 6, wherein the monolithic interlayer sheet has a thickness from 30 mils to 60 mils.

8. The interlayer sheet of claim 6, wherein the monolithic interlayer sheet has a thickness greater than 60 mils.

9. The interlayer sheet of claim 1, wherein said composition has a Tg of at least 65° C.

10. The interlayer sheet of claim 1, wherein said composition has an MFI of at least 0.9.

11. The interlayer sheet of claim 1, wherein said composition has an MFI of at least 1.2.

12. The interlayer sheet of claim 1, wherein said composition contains at least 80 wt. % poly(vinyl acetal) resin.

13. The interlayer sheet of claim 1, wherein the Mw of the poly(vinyl acetal) resin does not exceed 140,000.

14. The interlayer sheet of claim 1, wherein the Mw of the poly(vinyl acetal) resin does not exceed 130,000.

15. The interlayer sheet of claim 1, wherein the Mw of the poly(vinyl acetal) resin does not exceed 110,000.

16. The interlayer sheet of claim 1, wherein the poly(vinyl acetal) resin has a hydroxyl group content of 6 wt. % to 35 wt. %.

17. The interlayer sheet of claim 1, wherein the poly(vinyl acetal) resin has a solution viscosity of no more than 120 cps.

18. The interlayer sheet of claim 1, wherein the poly(vinyl acetal) has a vinyl butyral group content of at least 60 wt % and up to 90 wt. % based on the weight of the poly(vinyl acetal).

19. The interlayer sheet of claim 1, wherein the sheet has a modulus E' at 50° C. of at least 10,000,000 pascals.

20. The interlayer sheet of claim 1, wherein the sheet has a thickness of at least 30 mils.

21. The interlayer sheet of claim 1, wherein the composition has a solution viscosity of not greater than 100 cps.

22. The interlayer sheet of claim 1, wherein the interlayer sheet has a modulus E' at 40° C. of at least 400,000,000.

23. The interlayer sheet of claim 1, wherein the sheet is laminated between:
   (A) a layer of glass and a polymer film, and wherein said polymer film is not a poly(vinyl acetal) resin; or
   (B) two layers of glass.

24. A glass panel comprising:
   (A) a first glass layer;
   (B) one or more monolithic interlayer sheet(s); and
   (C) second glass layer;
   wherein the interlayer is disposed between the glass layers, wherein the monolithic interlayer sheet comprises a composition comprising:
   a poly(vinyl acetal) resin having a weight average molecular weight Mw of not greater than 160,000, and a plasticizer in an amount of 5 to 9 phr, and
   wherein at least one monolithic interlayer sheet used in the glass panel has a Tg of at least 46° C. and has a thickness of at least 15 mils.

25. The glass panel of claim 24, wherein the glass panel exhibits a creep resistance of not more than 1 mm when measured at 100° C. after 1000 hours.

26. The glass panel of claim 24, wherein the glass panel exhibits a creep resistance of not more than 0.5 mm when measured at 100° C. after 1000 hours.

27. The glass panel of claim 24, wherein the glass panel exhibits a creep resistance of not more than 0.2 mm when measured at 100° C. after 1000.

28. The glass panel of claim 24, wherein at least one monolithic interlayer sheet has a modulus E' at 40° C. of at least 600,000,000.

29. The glass panel of claim 24, wherein at least one monolithic interlayer sheet has a Tg of at least 50° C.

30. The glass panel of claim 24, wherein at least one monolithic interlayer sheet used in the glass panel has a thickness of at least 30 mils.

31. The glass panel of claim 24, wherein at least one monolithic interlayer sheet used in the glass panel has a thickness from 30 mils to 60 mils.

32. The glass panel of claim 24, wherein at least one monolithic interlayer sheet used in the glass panel has a thickness greater than 60 mils.

33. The glass panel of claim 24, wherein all monolithic interlayer sheet(s) in the glass panel have a Tg of at least 46° C.

* * * * *